US012553317B2

(12) United States Patent
Aldossary et al.

(10) Patent No.: US 12,553,317 B2
(45) Date of Patent: Feb. 17, 2026

(54) SYSTEMS AND METHODS FOR CONTROLLING FLUID FLOW IN A WELLBORE UTILIZING A FLOW CONTROL SYSTEM

(71) Applicant: Saudi Arabian Oil Company, Dhahran (SA)

(72) Inventors: Mohammed A. Aldossary, Dammam (SA); Mostafa M. Bori, Qatif (SA)

(73) Assignee: Saudi Arabian Oil Company, Dhahran (SA)

( * ) Notice: Subject to any disclaimer, the term of this patent is extended or adjusted under 35 U.S.C. 154(b) by 85 days.

(21) Appl. No.: 18/584,388

(22) Filed: Feb. 22, 2024

(65) Prior Publication Data

US 2025/0270902 A1 Aug. 28, 2025

(51) Int. Cl.

| | |
|---|---|
| ***E21B 43/08*** | (2006.01) |
| ***E21B 36/04*** | (2006.01) |
| ***E21B 43/12*** | (2006.01) |
| ***E21B 49/08*** | (2006.01) |
| ***F03G 7/06*** | (2006.01) |

(52) U.S. Cl.

CPC ............ *E21B 43/084* (2013.01); *E21B 36/04* (2013.01); *E21B 43/128* (2013.01); *E21B 49/08* (2013.01); *F03G 7/0614* (2021.08)

(58) Field of Classification Search

CPC ...... E21B 43/084; E21B 36/04; E21B 43/128; E21B 49/08; E21B 43/00; E21B 43/082; E21B 43/086; E21B 43/088; E21B 43/10; F03G 7/0614

See application file for complete search history.

(56) References Cited

U.S. PATENT DOCUMENTS

| | | | | |
|---|---|---|---|---|
| 10,591,078 | B2 | 3/2020 | Oehler et al. | |
| 10,982,516 | B2 | 4/2021 | Arukhe et al. | |
| 11,208,876 | B2 | 12/2021 | Eslinger et al. | |
| 11,261,698 | B2 | 3/2022 | Fripp et al. | |
| 2010/0288493 | A1* | 11/2010 | Fielder | E21B 47/008 166/250.15 |
| 2014/0367106 | A1* | 12/2014 | Wells | E21B 43/12 166/302 |
| 2016/0326851 | A1* | 11/2016 | Flores Perez | E21B 43/08 |
| 2021/0372237 | A1* | 12/2021 | Rajabov | E21B 43/04 |
| 2023/0027205 | A1* | 1/2023 | Stone | F03G 7/06324 |

* cited by examiner

*Primary Examiner* — Yanick A Akaragwe

(74) *Attorney, Agent, or Firm* — DINSMORE & SHOHL LLP

(57) ABSTRACT

A flow control system for controlling multiphase formation fluid flow in a wellbore may comprise an electric submersible pump, an intake screen, a controller, a sensor, and a heating component, wherein: the intake screen comprises a shape memory alloy (SMA) mesh configured to perform a reversible modification between a first shape and a second shape; the sensor is configured to measure one or more fluid properties; the controller is communicably coupled to the sensor and the heating component and is configured to: determine whether the one or more fluid properties fall outside a predetermined tolerance at the controller, and actuate the heating component upon determining the one or more fluid properties fall outside the predetermined tolerance; and the heating component is configured to modify the SMA mesh from the first shape to the second shape when actuated, and thereby to control the multiphase formation fluid flow through the intake screen.

20 Claims, 6 Drawing Sheets

SYSTEMS AND METHODS FOR CONTROLLING FLUID FLOW IN A WELLBORE UTILIZING A FLOW CONTROL SYSTEM

TECHNICAL FIELD

Embodiments herein generally relate to systems and methods for fluid flow in a wellbore, and particularly to systems and methods for controlling fluid flow utilizing a flow control system, such as a fluid control system comprising a shape memory alloy mesh.

BACKGROUND

Electric submersible pumps (ESP) are a common method of artificial lift used to efficiently extract large quantities of multiphase formation fluids (water, oil, and gas) from hydrocarbon-bearing subsurface formations.

SUMMARY

However, as multiphase formation fluids are produced, fluid properties, such as water content, often change. These changing fluid properties can have a significant impact on ESP performance in terms of emulsion flow. Particularly, as fluid flow changes from water-in-oil emulsion (oil as primary phase) to oil-in-water emulsions (water as primary phase), a significant increase in viscosity is known to occur, commonly described as the phase inversion phenomenon. This sudden increase in viscosity can significantly lower the efficiency of the ESP, and can potentially result in ESP failure if left unaddressed.

Accordingly, desired are methods and systems of controlling fluid flow in ESPs that are responsive to these changes in fluid conditions. For example, desired are methods and systems of controlling fluid in ESPs that can increase or decrease intake to the pump in response to a change in fluid or emulsion characteristics. Furthermore, as the conditions of the emulsion entering the ESP can only be reverse engineered at the surface, the systems of controlling fluid flow, and measurement of the fluid properties affecting the same, should ideally be conducted at or nearby the ESP intake.

Embodiments herein address the aforementioned need by the use of an adjustable intake screen at the ESP. Particularly, as described in further detail below, the intake screen comprises a shape memory alloy (SMA) mesh that may be configured to perform a reversible modification between a first shape and a second shape, such as in response to a change in temperature. This change in shape of the shape memory alloy mesh may correspond to a change in theoretical flow rate possible of the multiphase formation fluid through the mesh, such as by increasing a mesh size of the shape memory alloy mesh. Additionally or alternatively, the placement of a second mesh underlying the SMA mesh may cause openings of the shape memory alloy mesh to have a changed degree of overlap with openings of the second mesh when the shape memory alloy mesh is changed in shape, resulting in a change in theoretical flow rate through the intake screen.

As discussed in further detail below, the changing of the temperature of the SMA mesh may be accomplished by the actuation of a heating component configured to modify the SMA mesh to a transformation temperature at which the reversible modification occurs. The actuation of the heating component may in turn be controlled by a sensor or array of sensors and a controller that together measure one or more properties of the multiphase formation fluid, compare the properties to a predetermined tolerance, such as to determine when or if a phase inversion has occurred, and actuates or de-actuates the heating component as appropriate.

In accordance with one embodiment of the present disclosure, a flow control system for controlling multiphase formation fluid flow in a wellbore may comprise an electric submersible pump, an intake screen, a controller, a sensor, and a heating component, wherein: the intake screen comprises a shape memory alloy (SMA) mesh, wherein the SMA mesh is configured to perform a reversible modification between a first shape and a second shape; the controller is communicably coupled to the sensor and the heating component; the sensor is configured to measure one or more fluid properties; the controller is configured to: determine whether the one or more fluid properties fall outside a predetermined tolerance at the controller, and actuate the heating component upon determining the one or more fluid properties fall outside the predetermined tolerance; and the heating component is configured to modify the SMA mesh from the first shape to the second shape when actuated, and thereby to control the multiphase formation fluid flow through the intake screen.

In accordance with another embodiment of the present disclosure, a method of controlling multiphase formation fluid flow in a wellbore may comprise passing the multiphase formation fluid through a flow control system, wherein the flow control system comprises an electric submersible pump, an intake screen, a controller, a sensor, and a heating component, the intake screen comprises a shape memory alloy (SMA) mesh; and the sensor is configured measure one or more fluid properties of the multiphase formation fluid, and the controller is communicably coupled to the sensor and the heating component; measuring the one or more fluid properties via the sensor; determining via the controller whether the one or more fluid properties fall outside a pre-determined tolerance at the controller; and actuating the heating component to modify the mesh from a first shape to a second shape to control the multiphase formation fluid flow when the one or more fluid properties fall outside the pre-determined tolerance.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

These and other aspects of the present methods are described in further detail below with reference to the accompanying figures, in which one or more illustrated embodiments and/or arrangements of the systems and methods are shown. In the description of the embodiments that follows, like numerals denote like components across the various figures. The systems and methods of the present application are not limited in any way to the illustrated embodiments and/or arrangements. It should be understood that the systems and methods as shown in the accompanying figures are merely exemplary of the systems and methods of the present application, which can be embodied in various forms as appreciated by one skilled in the art. Therefore, it is to be understood that any structural and functional details disclosed herein are not to be interpreted as limiting the present systems and methods, but rather are provided as a representative embodiment and/or arrangement for teaching one skilled in the art one or more ways to implement the present systems and methods.

DETAILED DESCRIPTION

Figure 1:
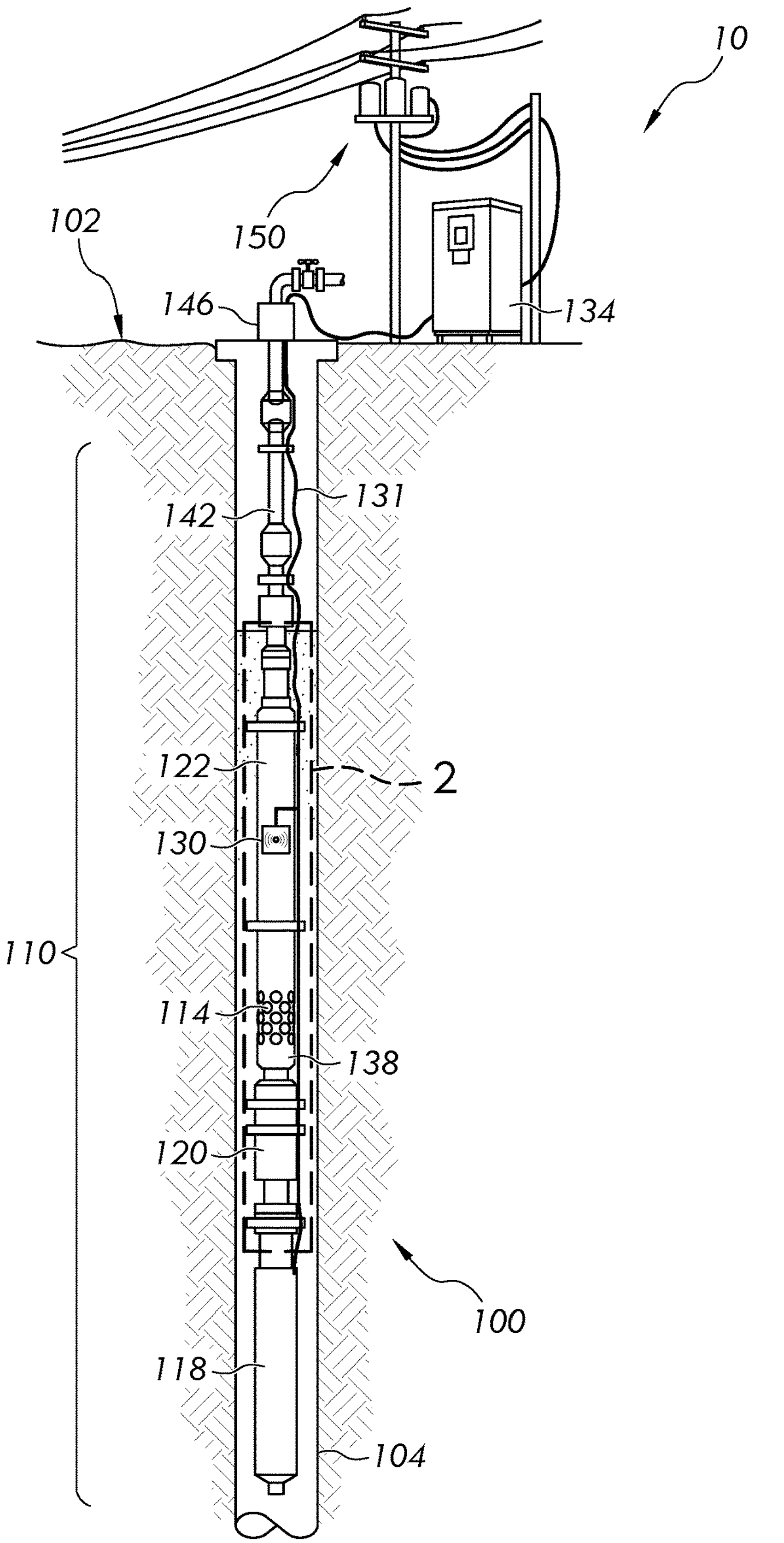
FIG. 1 illustrates a wellbore diagram with a flow control system as described in embodiments herein.

Embodiments herein generally relate to systems and methods for fluid flow in a wellbore, and particularly to systems and methods for controlling fluid flow utilizing a flow control system, such as a fluid control system comprising a shape memory alloy mesh. The methods and systems herein are described, in some instances, in the context of the subsurface formation of FIG. 1. However, it should be understood that the methods and systems described herein may have applicability with other subsurface formations than are illustrated in FIG. 1, as would be appreciated by those skilled in the art.

As used herein, the terms "downhole" and "uphole" may refer to a position within a wellbore relative to the surface, with uphole indicating direction or position closer to the surface and downhole referring to direction or position farther away from the surface. Similarly, as used herein, the terms "downward" and "upward" may refer to a position within a subterranean environment or subsurface formation relative to the surface, with upward indicating direction or position closer to the surface and downward referring to direction or position farther away from the surface.

As described in the present disclosure, a "subsurface formation" may refer to a body of rock that is sufficiently distinctive and continuous from the surrounding rock bodies that the body of the rock may be mapped as a distinct entity. A subsurface formation is, therefore, sufficiently homogenous to form a single identifiable unit containing similar properties throughout the subsurface formation, including, but not limited to, porosity and permeability.

As used herein, "wellbore," may refer to a drilled hole or borehole extending from the surface of the Earth down to the subsurface formation, including the openhole or uncased portion. The wellbore may form a pathway capable of permitting fluids to traverse between the surface and the subsurface formation. The wellbore may include at least a portion of a fluid conduit that links the interior of the wellbore to the surface. The fluid conduit connecting the interior of the wellbore to the surface may be capable of permitting regulated fluid flow from the interior of the wellbore to the surface and may permit access between equipment on the surface and the interior of the wellbore.

As used herein, a "wellbore wall" may refer to the interface through which fluid may transition between the subsurface formation and the interior of the wellbore. The wellbore wall may be unlined (that is, bare rock or formation) to permit such interaction with the subsurface formation or lined, such as by a tubular string, to prevent such interactions. The wellbore wall may also define the void volume of the wellbore.

Referring now to FIG. 1, a wellbore diagram of a flow control system 10 (also referred to as "system 10" for short) for controlling multiphase formation fluid flow in a wellbore. As shown in FIG. 1, the system 10 may comprise an electric submersible pump 110, an intake screen 114, a sensor 130, a controller 134, and a heating component 138.

As shown in FIG. 1, the system 10 may further comprise a subsurface formation 100, a surface collection point 102 (also referred to as "surface" for short), a wellbore 104, a tubing string 142, a wellhead 146, and a power source 150. As shown in FIG. 1, the wellbore 104 may extend from the surface collection point 102 to the subsurface formation 100. As shown in FIG. 1, wellhead 146 may be configured to accept the tubing string 142, and may be fluidly coupled to the same. In turn, the tubing string 142 may be fluidly coupled to the pump section 122.

The subsurface formation 100 may comprise and/or contain the multiphase formation fluid. The multiphase formation fluid may comprise a liquid phase and a gaseous phase. The liquid phase may comprise liquid hydrocarbons and/or water. The gaseous phase may comprise hydrocarbon gases and/or acid gases (such as, but not limited to, hydrogen sulfide, carbon dioxide, and carbon monoxide).

As described herein, the water may be pure water or any aqueous solution such as those selected from the group consisting of formation water; filtered seawater; untreated seawater; natural salt water; brackish salt water; saturated salt water; synthetic brine; mineral waters; potable water containing one or more dissolved salts, minerals, and organic materials; non-potable water containing one or more dissolved salts, minerals, and organic materials; deionized water; tap water; distilled water; fresh water; or combinations thereof.

The subsurface formation 100, and thereby the multiphase formation fluid may have a temperature of at least 30° C., such as from 30° C. to 80° C., from 80° C. to 100° C., from 100° C. to 150° C., from 150° C. to 200° C., from 200° C. to 400° C., or any combination of the previous ranges or smaller range therein, such as from 50° C. to 200° C. The subsurface formation 100, and thereby the multiphase formation fluid, may also have a pressure of at least 500 psi, such as from 500 psi to 1,000 psi, from 1,000 psi to 2,000 psi, from 2,000 psi to 3,000 psi, from 3,000 psi to 4,000 psi, from 4,000 psi to 6,000 psi, from 6,000 psi to 10,000 psi, or any combination of the previous ranges or smaller range therein, such as from 500 psi to 4,000 psi.

Still referring to FIG. 1, and as previously described, the system 10 may also comprise the electric submersible pump 110. As illustrated in FIG. 1, the electric submersible pump 110 may comprise the intake screen 114, a motor section 118, a pump section 122, the heating component 138, and optionally, a gas separator. The motor section 118 may be configured to supply drive to the pump section 122. The pump section 122 may be configured to lift the multiphase formation fluid through the electric submersible pump 110. Accordingly, the electric submersible pump 110 may be configured to produce the multiphase formation fluid from the subsurface formation 100 through the intake screen 114, through the tubing string 142, and through the wellhead 146 at the surface collection point 102.

Figure 2:
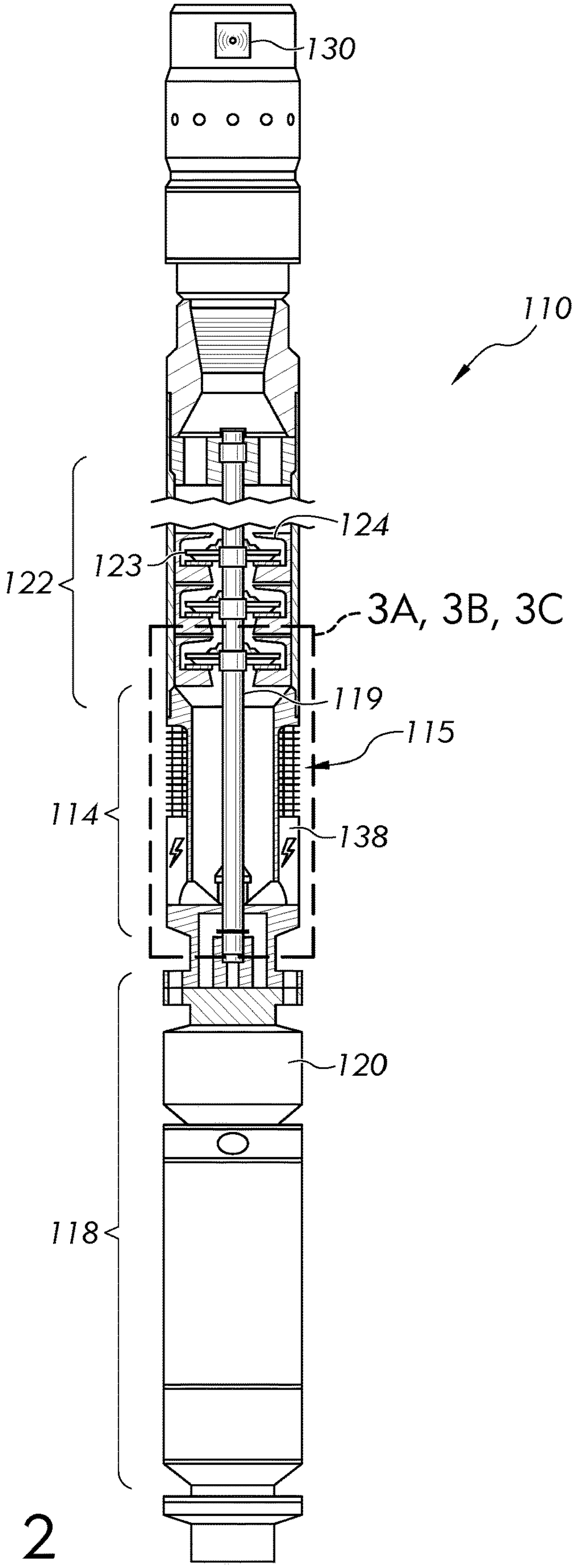
FIG. 2 illustrates an electric submersible pump, according to one or more embodiments herein.

As shown now in FIG. 2, the pump section 122 may comprise one or more rotors 123 and one or more stators 124, as may be understood in the art. The rotation of the one or more rotors 123 may be driven by a shaft 119, which may be part of the motor section 118. In at least some embodiments, the motor section 118 may further comprise a seal section 120. The seal section 120 may be operable to prevent multiphase formation fluid from leaking into the motor section 118, such as by the shaft 119.

As previously described, the electric submersible pump 110 may also comprise a gas separator. The gas separator may be configured to separate at least a portion of the gaseous phase in the multiphase formation fluid out of the same. The liquid phase may then enter the pump section 122 where it may be lifted by the same to the wellhead 146. The gas separator 118 may include, but may not be limited to, a centrifugal gas separator, a turbulent-flow gas separator, or any other category of gas separator known in the art. Additionally, without being limited by theory, the heating component 138 chosen may depend on its compatibility with the sensor(s) 130, as described in further detail below.

Referring back to FIG. 1, and as previously stated, the system 10 may comprise the power source 150. The power source 150 may be positioned at or nearby the surface collection point 102 to provide power to the electric submersible pump 110 and the controller 134. Particularly, as shown in FIG. 1, the system 10 may comprise one or more power cables 131, the one or more power cables 131 extending from the power source 150 to the electric submersible pump 110 and the controller 134. The power source 150 may in turn be electrically coupled to the electric submersible pump 110 and the controller 134. Moreover, as the electric submersible pump 110 may comprise the motor section 118, the sensor 130, and the heating component 138, the one or more power cables 131 may be electrically coupled to the motor section 118, the sensor 130, and the heating component 138, as shown in FIG. 1.

Figure 3A:
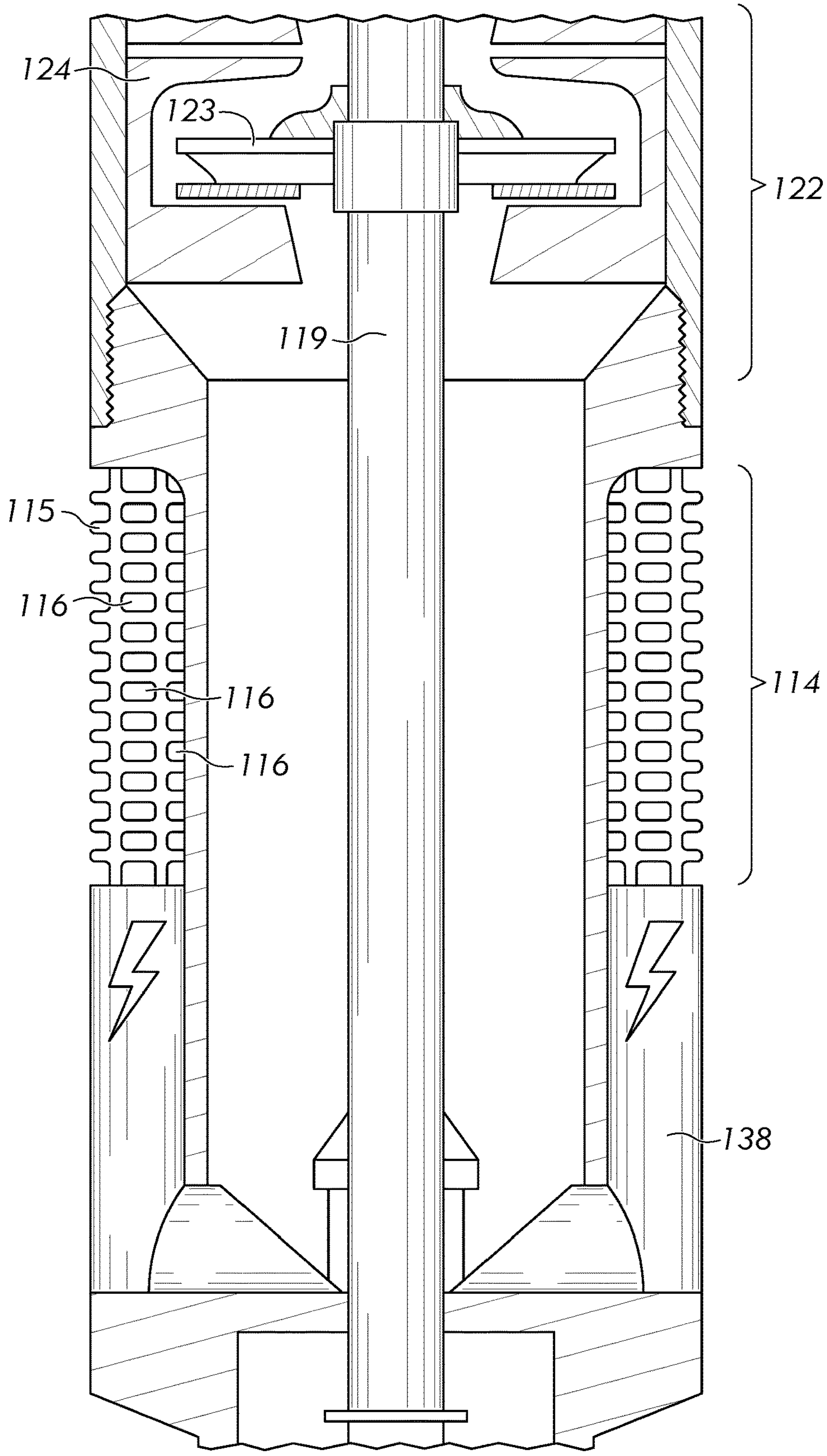
FIG. 3A illustrates a zoomed-in view of the electric submersible pump of FIG. 2A, according to one or more embodiments herein.
Figure 3B:
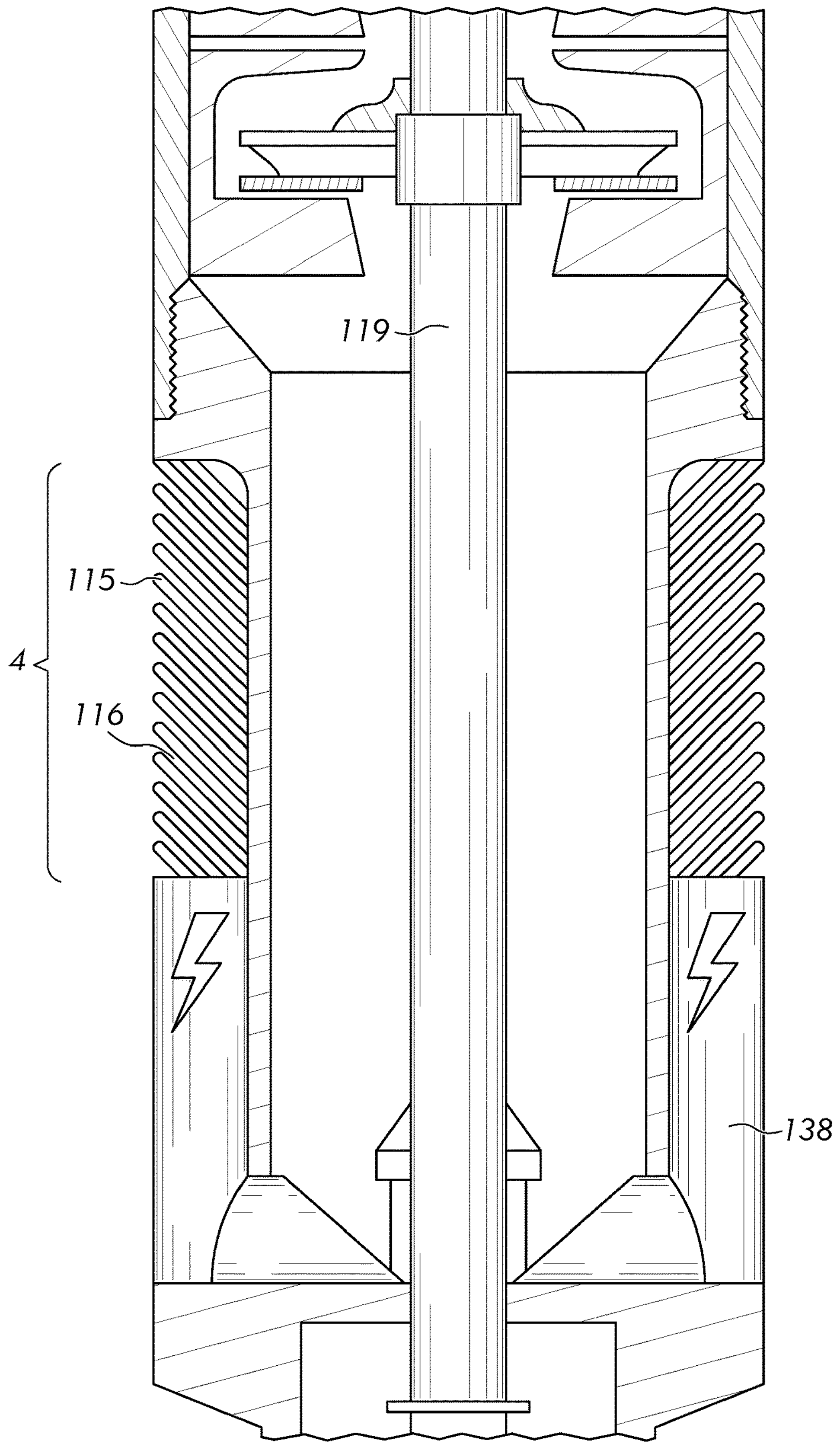
FIG. 3B illustrates a zoomed-in view of the electric submersible pump of FIG. 2A, according to one or more embodiments herein.
Figure 3C:
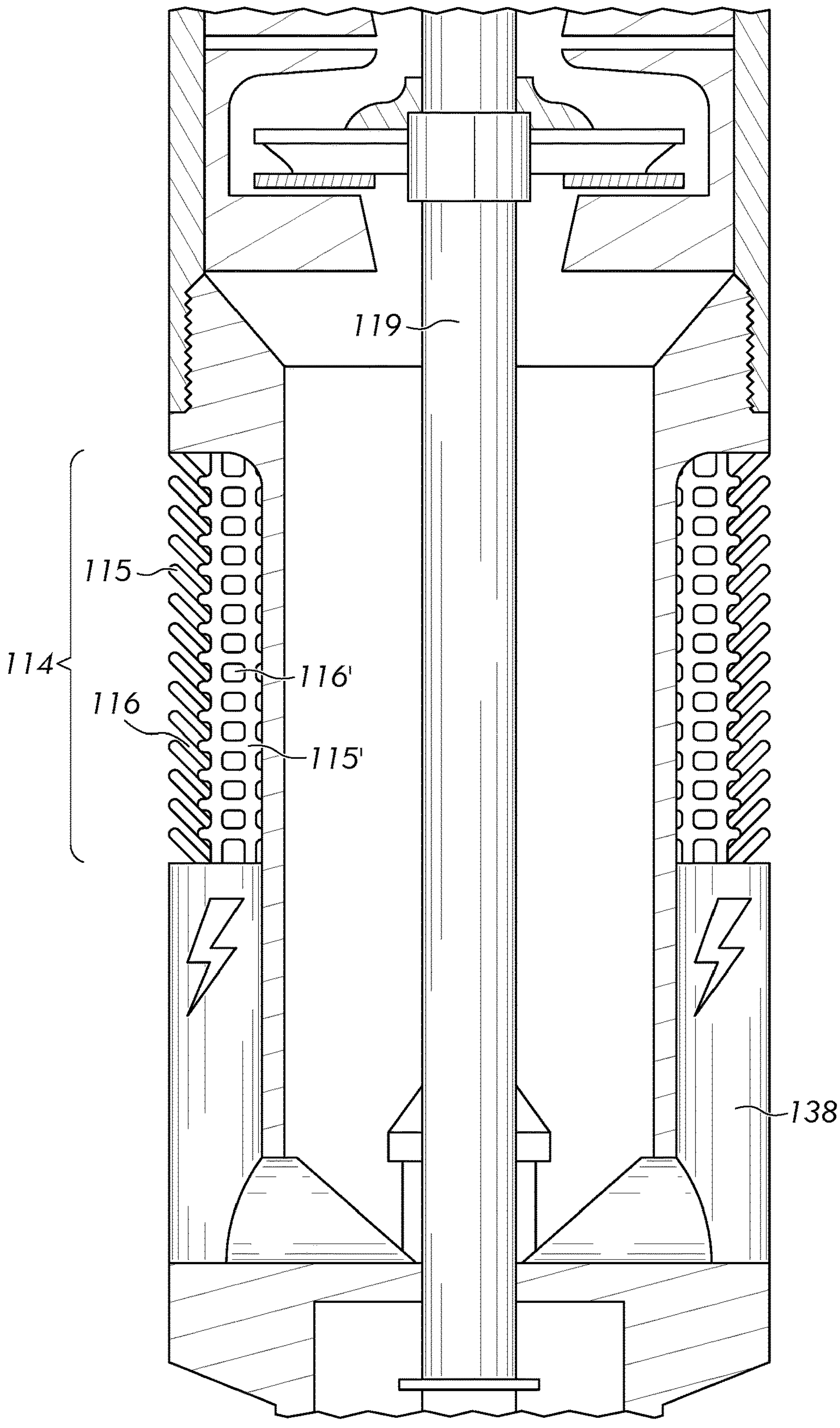

Referring now to FIGS. 2-3C, and as previously stated, the electric submersible pump 110 may comprise the intake screen 114. The intake screen 114 may in turn comprise a shape memory alloy (SMA), such as a shape memory alloy mesh 115. As shown in FIGS. 3A-3C, the shape memory alloy mesh 115 may also comprise one or more mesh openings 116, through which the multiphase formation fluid may enter the electric submersible pump 110. The shape memory alloy may comprise two or more of silver, gold, cadmium, copper, aluminum, nickel, tin, zinc, titanium, indium, iron, platinum, and manganese.

Figure 4:
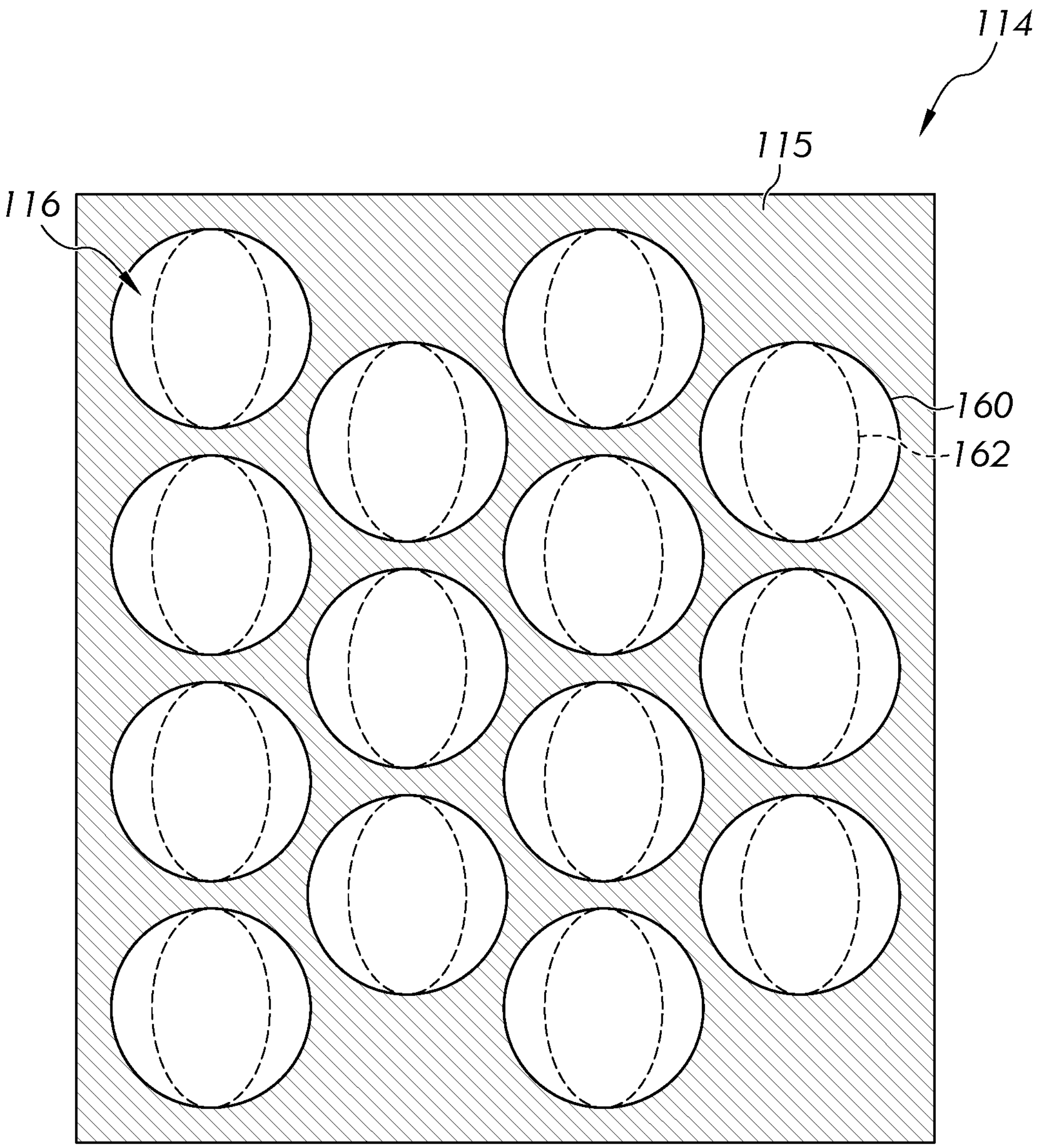
FIG. 4 illustrates a zoomed-in view of a shape memory alloy mesh in a first shape and a second shape, according to one or more embodiments herein.

Now referring to FIG. 4, and in embodiments, the shape memory alloy mesh 115 may be configured to perform a reversible modification between a first shape 160 and a second shape 162. The reversible modification may be triggered by exceeding a transformation temperature. The transformation temperature may be from greater than or equal to 50° C. to less than or equal to 180° C., such as from 50° C. to 60° C., from 60° C. to 70° C., from 70° C. to 100° C., from 100° C. to 120° C., from 120° C. to 140° C., from 140° C. to 160° C., from 160° C. to 180° C., or combinations of the previous ranges or smaller ranges therein, such as from 50° C. to 100° C.

In going from the first shape 160 to the second shape 162, an average opening of the shape memory alloy mesh 115 may in turn change, such as from larger to smaller, or from smaller to larger. For example, and in embodiments, a mesh size and/or average opening of the first shape 160 may be greater than a mesh size and/or average opening of the second shape 162, such as from 110% to 150% of the mesh size/average opening of the second shape. Alternatively, a mesh size of the first shape 160 may be less than a mesh size/average opening of the second shape 162, such as from 90% to 50% of the mesh size/average opening of the second shape.

Accordingly, an average opening size of the first shape may be from 200 microns to 2000 microns, such as from 200 microns to 600 microns, from 600 microns to 850 microns, from 850 microns to 1000 microns, from 1000 microns to 1500 microns, from 1500 microns to 2000 microns, or any combinations of the previous ranges or smaller ranges therein, such as approximately 850 microns.

An average opening size of the second shape may be from 15 microns to 200 microns, such as from 15 microns to 30 microns, from 30 microns to 50 microns, from 50 microns to 100 microns, from 100 microns to 150 microns, from 150 microns to 190 microns, from 190 microns to 200 microns, or combinations of the previous ranges or smaller ranges therein. In some embodiments, the sizing may be vice versa for the first and second shapes. Without being limited by theory, a theoretical flow rate through the shape memory alloy mesh 115 in the first shape 160 may thus be different (greater or lesser) than a flow rate through the shape memory alloy mesh 115 in the second shape 162 at given conditions, allowing flow control of the multiphase formation fluid.

Additionally or alternatively from the previous, and now referring to FIG. 3C, the intake screen 114 may further comprise a second mesh 115'. The second mesh 115' may also comprise one or more second mesh openings 116', through which the multiphase formation fluid may enter the electric submersible pump 110, similar to the shape memory alloy mesh 115. The second mesh 115' may underlie or overlay the shape memory alloy mesh 115. In at least some embodiments, the second mesh 115' may not be comprised of a shape memory alloy, such that the second mesh 115' is static.

As shown in FIG. 3C, the mesh openings 116 of the shape memory alloy mesh 115 may have a degree of overlap with the second mesh openings 116' of the second mesh 115'. However, upon reversible modification of the shape memory alloy mesh 115, a first degree of overlap between the two mesh openings may change to a second degree of overlap between the two meshes, such that the second degree of overlap is greater than or less than the first degree of overlap. For example, and in embodiments, the first degree of overlap may be from 110% to 150% of the second degree of overlap. Alternatively, the first degree of overlap may be from 90% to 50% of the second degree of overlap.

Accordingly, without being limited by theory, a theoretical flow rate through the two meshes when the shape memory alloy mesh 115 is in the first shape 160 may thus be different (greater or lesser) than a flow rate through the said meshes when the shape memory alloy mesh 115 is in the second shape 162 at given conditions, allowing flow control of the multiphase formation fluid.

For example, and without being limited by theory, the shape memory alloy mesh 115 may be configured in a helical shape, such that transformation from the first shape 160 to the second shape 162 comprises extending the helical shape along the length of the electric submersible pump 110, and thereby increases a degree of overlap between the openings of the two meshes, and/or increases a mesh size of the shape memory alloy mesh 115.

In at least some embodiments, the modification of the shape memory alloy mesh 115 from the first shape 160 to the second shape 162 may additionally or alternatively change a permeability through the shape memory alloy mesh 115, the intake screen 114, or both. For example, and in embodiments, a permeability of the shape memory alloy mesh may be from 3 Darcy (D) to 1 D in the first shape, and from 0.5 D to 0.1 D in the second shape, or vice versa for the first and second shapes.

Referring to FIGS. 1-4, and as previously stated, the system 10 may comprise the heating component 138. The heating component 138 may be thermally coupled to the intake screen 114, and may be positioned uphole or downhole of the intake screen 114. When actuated, the heating component 138 may be configured to modify the shape memory alloy mesh 115 from the first shape 160 to the second shape 162. For example, and in embodiments, the heating component 138 may comprise an electrical resistor coupled to the one or more power cables 131, such as by a lead line. Application of electrical current to the heating component 138 by the lead line may thereby generate heat that may in turn transfer to the shape memory alloy mesh 115, and thereby heat the shape memory alloy mesh 115 to above the transformation temperature. Additionally, cutting off electrical current to the heating component may thereby cool the shape memory alloy 115 mesh to below the transformation temperature. In at least such an embodiment, the heating component 138 may comprise a ceramic or composite material.

While the electrical resistor is one such concept for the heating component 138, it should be appreciated that there may be multiple ways to apply heat to the shape memory alloy mesh 115, such as, but not limited to microwave radiation, circulation of a heated fluid, induction heating, conduction heating, or combinations thereof.

Referring to FIGS. 1-4, and as previously stated, the system 10 may comprise the sensor 130. The sensor 130 may itself comprise one or more sensor elements, such as a sensor array. The sensor 130 may be configured to measure one or more fluid properties. The one or more fluid properties may comprise fluid density, conductivity, compressibility, temperature, pressure, viscosity, specific heat, compressibility, optical density, gamma-ray transmittance, or combinations thereof. Accordingly, the sensor 130 may comprise one or a number of sensors configured to measure the previous properties, including but not limited to a nuclear attenuation sensor, a resistivity sensor, a pressure sensor, a temperature sensor, a flowmeter, or combinations thereof.

Still referring to FIGS. 1-4, and as previously stated, the system 10 may also comprise the controller 134. The controller 134 may be a microcontroller unit, or it may comprise multiple or sub-microcontroller units. The controller 134 may be communicatively coupled to the sensor 130 and the heating component 138. The communicative coupling may be directly, such as by optic fiber cable, or it may be indirectly, such as wirelessly. Moreover, while the controller is illustrated at the surface collection point, the controller 134 may alternatively be part of, or disposed on the electric submersible pump 110.

The controller 134 may comprise a processor communicatively coupled to a memory. The communications hardware of the controller 134 may receive data, such as the one or more fluid properties measured by the sensor 130, and transfer the data to be stored in the memory. The processor may be configured to pull the data from the memory, conduct one or more operations on the data, before communicating instructions to the controller 134 and/or the heating component 138. For example, and in embodiments, the controller 134 may be configured to determine whether the one or more fluid properties fall outside a predetermined tolerance.

The predetermined tolerance may be determined according to modeling, laboratory data, the experience of operators, or combinations thereof. For example, and in embodiments, the predetermined tolerance may be the expected point in which the multiphase formation fluid transitions, based on the fluid property or combination of properties measured, from mostly water-in-oil emulsion to mostly oil-in-water emulsion. Additionally or alternatively, the predetermined tolerance may be the expected point in which the multiphase formation fluid transitions, based on the fluid property or combination of properties measured, from mostly oil to mostly water.

For example, and in embodiments, the predetermined tolerance of the fluid gamma-ray attenuation may be from 0 to 0.1 $cm^{-1}$ measured at 50 keV, or from 0.1 to 0.2 $cm^{-1}$ measured at 50 keV. The predetermined tolerance of the fluid conductivity may be from 0 to 0.1 ohms per meter (Ω/m), or from 0.1 to 100 ohms per meter. The predetermined tolerance of the specific gravity may be from 0.55 to 0.91, or from 0.91 to 1.2.

Moreover, the controller 134 may be additionally configured to actuate the heating component 138 upon determining that the one or more fluid properties fall outside the predetermined tolerance, i.e. upon receiving instructions from the processor. This may in turn increase or decrease the theoretical flow rate through the intake screen 114, depending on the orientation of the shape memory alloy mesh 115.

Without being limited by theory, it is contemplated that the flow control systems 10 herein, and particularly the intake screens 114, may find applicability to other forms of artificial lift, or as intake screens for, sucker rod pumps, progressive cavity pumps, and plunger lift, as well as with a variety of bottom hole assemblies for the same, although this list is not meant to be limiting. In such embodiments, the flow control system 10 may comprise the other form of artificial lift (in replace of the electric submersible pump), the intake screen 114, the heating component 138, and the controller 134.

As previously stated, embodiments herein may also be directed to methods for controlling multiphase formation fluid flow in a wellbore. The method may initially comprise inserting a flow control system into the wellbore. The flow control system may be any of the flow control systems previously described. The method may then comprise passing the multiphase formation fluid through the flow control system, such as through the intake screen of the electric submersible pump at a first flow rate. The method may also comprise measuring one or more fluid properties via the sensor, wherein the one or more fluid properties may be any of the fluid properties previously discussed.

The method may then comprise determining via the controller whether the one or more fluid properties fall outside the pre-determined tolerance at the controller. The method also comprise actuating the heating component to modify the mesh from a first shape to a second shape to control the multiphase formation fluid flow when the one or more fluid properties fall outside the pre-determined tolerance. The method may then passing the multiphase formation fluid through the flow control system at a second flow rate, wherein the second flow is greater than or less than the first flow rate.

For the purpose of describing the simplified illustrations and descriptions of the relevant figures, the numerous valves, sensors, controllers, couplings, packers, and the like that may be employed and well known to those of ordinary skill in the art of certain hydrocarbon production operations may or may not be included. It should be understood that these components, when not illustrated, are within the spirit and scope of the present embodiments disclosed. Further, operational components, such as those described in the present disclosure, may be added to the embodiments described in this disclosure.

It is noted that recitations in the present disclosure of a component of the present disclosure being "configured", "operable" or "sufficient" in a particular way, to embody a particular property, or to function in a particular manner, are structural recitations, as opposed to recitations of intended use. More specifically, the references in the present disclosure to the manner in which a component is "configured" or "operable" or "sufficient" denotes an existing physical condition of the component and, as such, is to be taken as a definite recitation of the structural characteristics of the component.

The singular forms "a," "an" and "the" include plural referents, unless the context clearly dictates otherwise.

Throughout this disclosure ranges are provided. It is envisioned that each discrete value encompassed by the ranges are also included. Additionally, the ranges which may be formed by each discrete value encompassed by the explicitly disclosed ranges are equally envisioned.

As used in this disclosure and in the appended claims, the words "comprise," "has," and "include" and all grammatical variations thereof are each intended to have an open, non-limiting meaning that does not exclude additional elements or steps.

As used in this disclosure, terms such as "first" and "second" are arbitrarily assigned and are merely intended to differentiate between two or more instances or components. It is to be understood that the words "first" and "second" serve no other purpose and are not part of the name or description of the component, nor do they necessarily define a relative location, position, or order of the component. Furthermore, it is to be understood that the mere use of the term "first" and "second" does not require that there be any "third" component, although that possibility is contemplated under the scope of the present disclosure.

Having described the subject matter of the present disclosure in detail and by reference to specific embodiments, it is noted that the various details disclosed in the present disclosure should not be taken to imply that these details relate to elements that are essential components of the various embodiments described in the present disclosure. Further, it will be apparent that modifications and variations are possible without departing from the scope of the present disclosure, including, but not limited to, embodiments defined in the appended claims.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A flow control system for controlling multiphase formation fluid flow in a wellbore, comprising an electric submersible pump, an intake screen, a controller, a sensor, and a heating component, wherein:

the intake screen comprises a shape memory alloy (SMA) mesh, wherein the SMA mesh is configured to perform a reversible modification between a first shape and a second shape;

the controller is communicably coupled to the sensor and the heating component;

the sensor is configured to measure one or more fluid properties;

the controller is configured to:

determine whether the one or more fluid properties fall outside a predetermined tolerance at the controller, and actuate the heating component upon determining the one or more fluid properties fall outside the predetermined tolerance; and the heating component is configured to modify the SMA mesh from the first shape to the second shape when actuated, and thereby to control the multiphase formation fluid flow through the intake screen.

2. The system of claim 1, wherein:

the intake screen further comprises a second mesh underlying or overlaying the SMA mesh;

openings of the SMA mesh have a first degree of overlap with openings of the second mesh in the first shape, and a second degree of overlap with the openings of the second mesh in the second shape; and the first degree of overlap is greater than or less than the second degree of overlap.

3. The system of claim 1, wherein the SMA mesh comprises two or more of silver, gold, cadmium, copper, aluminum, nickel, tin, zinc, titanium, indium, iron, platinum, and manganese.

4. The system of claim 1, wherein the heating component is configured to modify a temperature of the mesh to greater than a transformation temperature of the SMA mesh.

5. The system of claim 4, wherein the transformation temperature is greater than or equal to 50° C. and less than or equal to 180° C.

6. The system of claim 1, wherein:

a mesh size of the first shape is greater than a mesh size of the second shape; or a mesh size of the first shape is less than a mesh size of the second shape.

7. The system of claim 1, wherein the one or more fluid properties comprise fluid density, conductivity, temperature, pressure, viscosity, specific heat, compressibility, optical density, gamma-ray transmittance, specific gravity, or combinations thereof.

8. The system of claim 1, wherein the predetermined tolerance comprises a tolerance of fluid density, conductivity, temperature, pressure, viscosity, specific heat, compressibility, optical density, gamma-ray attenuation, specific gravity, or combinations thereof.

9. The system of claim 8, wherein the sensor measures fluid gamma-ray attenuation, and the predetermined tolerance of the fluid gamma-ray attenuation is from 0 to 0.1 $cm^{-1}$ measured at 50 keV, or from 0.1 to 0.2 $cm^{-1}$ measured at 50 keV.

10. The system of claim 8, wherein the sensor measures the fluid conductivity, and the predetermined tolerance of the fluid conductivity is from 0 to 0.1 ohms per meter (Q/m), or from 0.1 to 100 ohms per meter.

11. The system of claim 8, wherein the sensor measures the specific gravity, and the predetermined tolerance of the specific gravity is from 0.55 to 0.91, or from 0.91 to 1.2.

12. A method of controlling multiphase formation fluid flow in a wellbore, the method comprising:

passing the multiphase formation fluid through a flow control system, wherein the flow control system comprises an electric submersible pump, an intake screen, a controller, a sensor, and a heating component, the intake screen comprises a shape memory alloy (SMA) mesh; and the sensor is configured measure one or more fluid properties of the multiphase formation fluid, and the controller is communicably coupled to the sensor and the heating component;

measuring the one or more fluid properties via the sensor;

determining via the controller whether the one or more fluid properties fall outside a pre-determined tolerance at the controller; and actuating the heating component to modify the mesh from a first shape to a second shape to control the multiphase formation fluid flow when the one or more fluid properties fall outside the pre-determined tolerance.

13. The method of claim 12, wherein:

the intake screen further comprises a second mesh underlying or overlaying the SMA mesh;

openings of the SMA mesh have a first degree of overlap with openings of the second mesh in the first shape, and a second degree of overlap with the openings of the second mesh in the second shape; and the first degree of overlap is greater than or less than the second degree of overlap.

14. The method of claim 12, wherein the SMA mesh comprises two or more of silver, gold, cadmium, copper, aluminum, nickel, tin, zinc, titanium, indium, iron, platinum, and manganese.

15. The method of claim 12, wherein actuating the heating component modifies a temperature of the SMA mesh to greater than a transformation temperature of the SMA mesh.

16. The method of claim 15, wherein the transformation temperature is greater than or equal to 50° C. and less than or equal to 180° C.

17. The method of claim 12, wherein:

a mesh size of the first shape is greater than a mesh size of the second shape; or a mesh size of the first shape is less than a mesh of the second shape.

18. The method of claim 12, wherein the one or more fluid properties comprise fluid density, conductivity, temperature, pressure, viscosity, specific heat, compressibility, optical density, gamma-ray transmittance, specific gravity, or combinations thereof.

19. The method of claim 12, wherein the predetermined tolerance comprises a tolerance of fluid density, conductivity, temperature, pressure, viscosity, specific heat, compressibility, optical density, gamma-ray attenuation, specific gravity, or combinations thereof.

20. The method of claim 19, wherein:

the sensor is configured to measure the fluid gamma-ray attenuation, and the predetermined tolerance of the fluid gamma-ray attenuation is from 0 to 0.1 $cm^{-1}$ measured at 50 keV, or from 0.1 to 0.2 $cm^{-1}$ measured at 50 keV;

the sensor is configured to measure the fluid conductivity, and the predetermined tolerance of the fluid conductivity is from 0 to 0.1 ohms per meter (Ω/m), or from 0.1 to 100 ohms per meter;

the sensor is configured to measure the specific gravity, and the predetermined tolerance of the specific gravity is from 0.55 to 0.91, or from 0.91 to 1.2.

* * * * *